US011130455B2

(12) United States Patent
Cha

(10) Patent No.: US 11,130,455 B2
(45) Date of Patent: Sep. 28, 2021

(54) VEHICLE SECURITY ENHANCEMENT

(71) Applicant: Ford Global Technologies, LLC, Dearborn, MI (US)

(72) Inventor: Byungho Cha, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/660,577

(22) Filed: Oct. 22, 2019

(65) Prior Publication Data

US 2021/0114534 A1    Apr. 22, 2021

(51) Int. Cl.
| | | |
|---|---|---|
| *B60K 35/00* | (2006.01) | |
| *B60K 37/02* | (2006.01) | |
| *B60R 1/12* | (2006.01) | |
| *B60R 21/015* | (2006.01) | |
| *B60R 16/023* | (2006.01) | |
| *G05B 23/02* | (2006.01) | |
| *H04L 29/08* | (2006.01) | |
| *H04L 12/40* | (2006.01) | |

(52) U.S. Cl.
CPC ...... *B60R 16/0232* (2013.01); *G05B 23/0213* (2013.01); *H04L 67/12* (2013.01); *G05B 2219/24065* (2013.01); *H04L 2012/40215* (2013.01); *H04L 2012/40273* (2013.01)

(58) Field of Classification Search
CPC .............................................. G05D 2201/0213
See application file for complete search history.

(56) References Cited

U.S. PATENT DOCUMENTS

| | | | |
|---|---|---|---|
| 9,531,750 B2 | 12/2016 | Lawlis | |
| 9,616,828 B2 | 4/2017 | Ben et al. | |
| 2003/0216889 A1* | 11/2003 | Marko | G07C 5/008 |
| | | | 702/182 |
| 2013/0212659 A1 | 8/2013 | Maher et al. | |
| 2014/0250531 A1 | 9/2014 | Moeller et al. | |
| 2017/0013005 A1* | 1/2017 | Galula | H04L 63/1441 |
| 2019/0308589 A1* | 10/2019 | Maluf | B60R 25/104 |
| 2019/0312892 A1* | 10/2019 | Chung | G06F 21/85 |
| 2020/0334926 A1* | 10/2020 | Tsurumi | B60W 50/14 |

OTHER PUBLICATIONS

Md Swawibe Ul Alam, "Securing Vehicle Electronic Control Unit (ECU) Communications and Stored Data," Queen's University, Kingston, Ontario, Canada, Jun. 2019 (96 pages).

* cited by examiner

*Primary Examiner* — Joseph H Feild
*Assistant Examiner* — Pameshanand Mahase
(74) *Attorney, Agent, or Firm* — Frank Lollo; Eversheds Sutherland (US) LLP

(57) ABSTRACT

This disclosure describes systems, methods, and devices related to vehicle security enhancement. For example, a vehicle may receive a plurality of data values from an onboard diagnostic system (OBD) of a vehicle, wherein a first data value is received from a first sensor of the vehicle and a second data value is received from a second sensor of the vehicle. The vehicle may determine a third data value received from a controller area network (CAN) bus of the vehicle. The vehicle may determine the third data value is associated with a false message originating from a device external to the vehicle based on performing a correlation analysis between the first value, the second value and the third value. The vehicle may discard the third data value based on the correlation analysis.

18 Claims, 3 Drawing Sheets

VEHICLE SECURITY ENHANCEMENT

TECHNICAL FIELD

This disclosure generally relates to systems, methods, and devices for wireless communications and, more particularly, vehicle security enhancement.

BACKGROUND

A vehicle may include in-vehicle networks for exchanging messages between components. To protect the in-vehicle networks it is important to deploy security mechanisms such as message encryption, message authentication, intrusion detection system, or anomaly detection system.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Example embodiments described herein provide certain systems, methods, and devices, for vehicle security enhancement.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Overview

The systems, devices, and methods disclosed herein are configured to facilitate a vehicle security enhancement in a vehicle. In some embodiments, the systems, devices, and methods herein can be configured to provide mechanisms for enhancing a vehicle operator's experience by providing and activating remediating actions to enhance the driving environment in response thereto.

The era of connected and autonomous vehicles (CAVs) is coming. CAVs are adopting advanced sensors, which can bring internal and external environment information (e.g., Camera, RADAR, LiDAR, SONAR Sensors). To protect the in-vehicle networks (e.g., local interconnect network (LIN), CAN, Flex Ray, Most, Automotive Ethernet), it is important to deploy security mechanisms such as message encryption, message authentication code (MAC), intrusion detection system (IDS), anomaly detection, and CAN ID randomization. However, hackers are constantly working to get around security mechanisms in general. It is important to fill the gap between security mechanisms and necessary information by adding additional measures from other sources.

A vehicle security enhancement system may facilitate a new approach of in-vehicle anomaly detection method using the property of sensor and electronic control unit (ECU) data consistency by bringing additional sensor information from Camera, RADAR, LiDAR, and SONAR sensors.

In order to attack various controls of a vehicle, attackers may attempt to remotely compromise TCU, IVI through Wi-Fi, 3G, or 4G, and repeatedly inject CAN messages into the CAN-bus via CAN interfaces with corresponding IDs of Engine Control Module (ECM), Body Control Module (BCM), Electronic Brake Control Module (EBCM), Heating, Ventilation, and Air Conditioning (HVAC).

A vehicle security enhancement system may facilitate an anomaly detection system which has three advantages as follows: 1) a vehicle security enhancement system may not add any additional physical sensors to provide reference data as a protection mechanism because of exploring heterogeneous sensors already present in vehicles; 2) a vehicle security enhancement system provides additional sensor values as reference data for a more robust anomaly detection mechanism; and 3) a vehicle security enhancement system provides simple and low complexity anomaly detection mechanisms to identify CAN message payload manipulation.

Illustrative Embodiments

Figure 1:
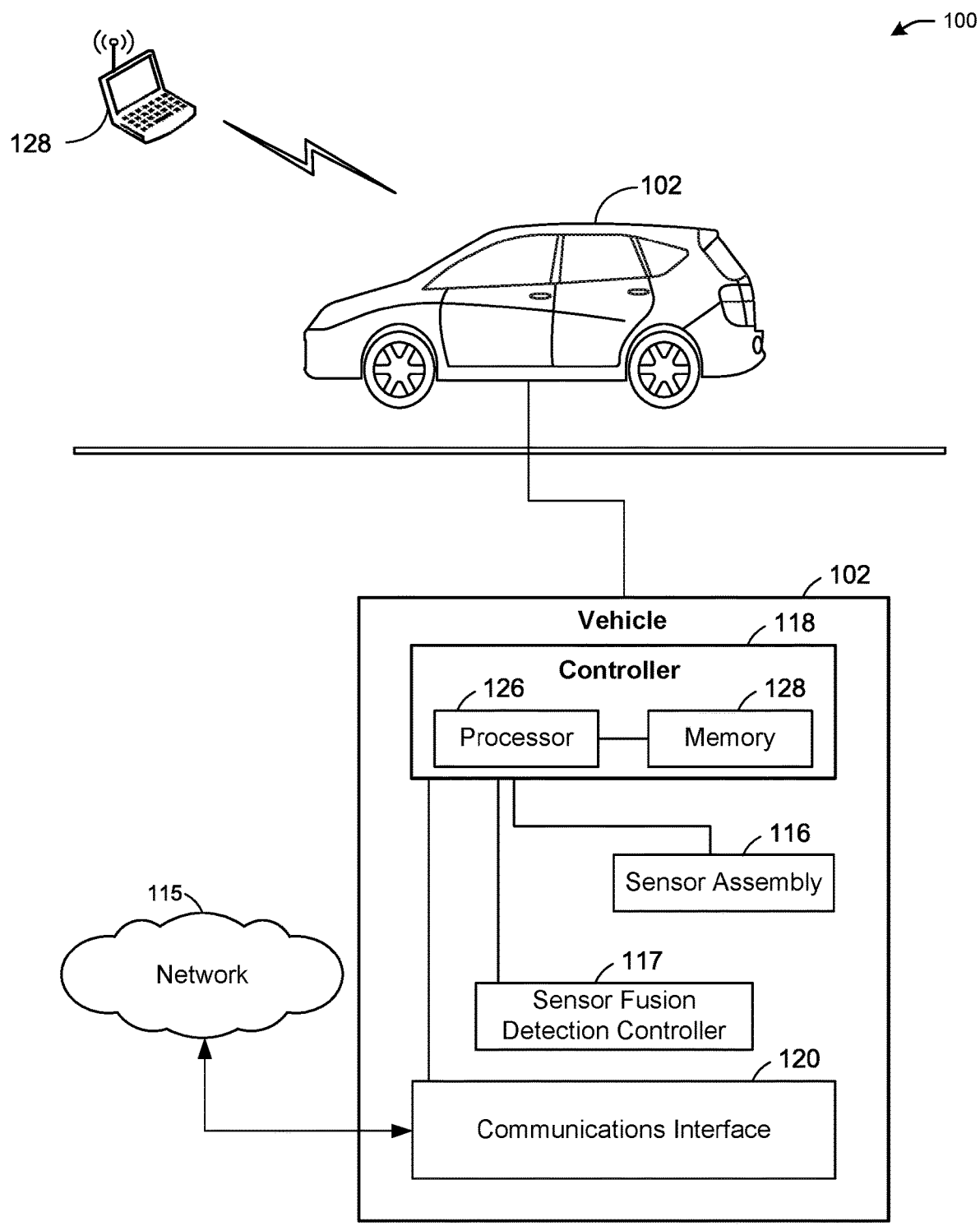
FIG. 1 depicts a diagram illustrating an example environment for techniques and structures, in accordance with one or more example embodiments of the present disclosure.

Turning now to the drawings, FIG. 1 depicts an illustrative architecture 100 in which techniques and structures of the present disclosure may be implemented.

The illustrative architecture 100 may include a vehicle 102. The vehicle 102 may support various operations in accordance with the disclosure. The vehicle 102 may be any of various types of vehicles such as a gasoline powered vehicle, an electric vehicle, a hybrid electric vehicle, or an autonomous vehicle.

The vehicle 102 may be located in proximity to a hacker device 128. In general, the hacker device 128 may attempt to interact with the vehicle 102 either encountered during driving the vehicle 102 or when the vehicle is stationary. The attacker device 128 may attempt to remotely access one or more components of the vehicle 102 in order to alter the function of a component of the vehicle 102, such as, trying to inject CAN messages into a CAN bus of the vehicle in an attempt to activate some features on the vehicle 102.

In the exemplary embodiment shown in FIG. 1, the vehicle 102 may be connected to a network 115 that allows the vehicle 102 to communicate with external services and/or devices (e.g., computers, user devices, or other vehicles). The network 115 may include any one, or a combination of networks, such as a local area network (LAN), a wide area network (WAN), a telephone network, a cellular network, a cable network, a wireless network, and/or private/public networks such as the Internet. For example, the network 115 may support communication technologies such as Bluetooth, cellular, near-field communication (NFC), Wi-Fi, Wi-Fi direct, machine-to-machine communication, and/or man-to-machine communication.

In general, the vehicle 102 may comprise any vehicle that may comprise a controller 118, a sensor assembly 116, a sensor fusion detection controller 117, and a communications interface 120.

The vehicle 102 may include a cabin having a display in electronic communication with the controller 118. The display may be a touchscreen that displays information to the passengers of the vehicle and/or functions as an input, such as whether or not the rider is authenticated. A person having ordinary skill in the art will appreciate that many different display and input devices are available and that the present disclosure is not limited to any particular display. An audio system may be disposed within the cabin and may include one or more speakers for providing information and entertainment to the driver and/or passengers. The audio system may also include a microphone for receiving voice inputs.

In some embodiments, the controller 118 may comprise a processor 126 and memory 128. The memory 128 includes machine-accessible instructions (e.g., computer-readable and/or computer-executable instructions) that can be accessed and executed by the processor 126. The processor 126 can be embodied in, or can include, for example, a tensor processing unit (TPU); multiple TPUs; a graphics processing unit (GPU); multiple GPUs; a central processing unit (CPU); multiple CPUs; an application-specific integrated circuit (ASIC); a microcontroller; a programmable logic controller (PLC); a field programmable gate array (FPGA); a combination thereof; or the like. In one or more embodiments, the processor 126 can be arranged in a single computing device (e.g., an electronic control unit (ECU), an in-car infotainment (ICI) system, or the like). In other configurations, the processor 126 can be distributed across two or more computing devices (e.g., multiple ECUs; a combination of an ICI system and one or many ECUs; or the like).

In some embodiments, the sensor assembly 116 may comprise one more sensors capable of capturing data received from objects within the range of the one or more sensors. In some embodiments, the sensor assembly 116 could comprise any of a camera, a time-of-flight (TOF) camera, light detection and ranging (LIDAR), or other similar systems which may be utilized to recognize and capture data associated with objects and/or a driver of the vehicle 102. The sensor assembly 116 may include a steering sensor that may be disposed proximate the steering shaft to measure a steering angle. The vehicle 102 also includes a speed sensor that may be disposed at the wheels or in the transmission of the vehicle 102. The speed sensor is configured to output a signal to the controller 118 indicating the speed of the vehicle. Also, the sensor assembly 116 may comprise a yaw sensor that may be in communication with the controller 118 and is configured to output a signal indicating the yaw of the vehicle 102.

The sensor assembly 116 may be configured for sensing areas external and/or internal to the vehicle. The controller 118 may communicate via a serial bus (e.g., controller area network (CAN)) or via dedicated electrical conduits. The controller generally includes any number of microprocessors (including processor 126), ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and local interconnect network (LIN)). Used herein, a reference to "a controller" refers to one or more controllers and/or computer processors. The controller 118 may receive signals from the vision system and may include memory (e.g., memory 128) containing machine-readable instructions for processing the data from the vision system. The controller 118 may be programmed to output instructions to at least the display, the audio system, the steering system, the braking system, and/or the power plant to autonomously operate the vehicle 102.

The controller 118 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). In some cases, the vehicle controller 118 may include more than one computer such as, for example, a first computer that controls engine operations and a second computer that operates an infotainment system.

In one or more embodiments, the sensor fusion detection controller 117 may be located separately from other components of the vehicle 102. The sensor fusion detection controller 117 may comprise one or more in-vehicle networks that may provide data associated with one or more components of the vehicle.

The various components of vehicle 102 are communicatively coupled to each other via one or more buses. The one or more buses may be implemented using various wired and/or wireless technologies. For example, the one or more buses can include a vehicle bus that uses a controller area network (CAN) bus protocol, a Media Oriented Systems Transport (MOST) bus protocol, and/or a CAN flexible data (CAN-FD) bus protocol. Some or all portions of the one more buses may also be implemented using wireless technologies such as Bluetooth®, Zigbee®, or near-field-communications (NFC).

Figure 2:
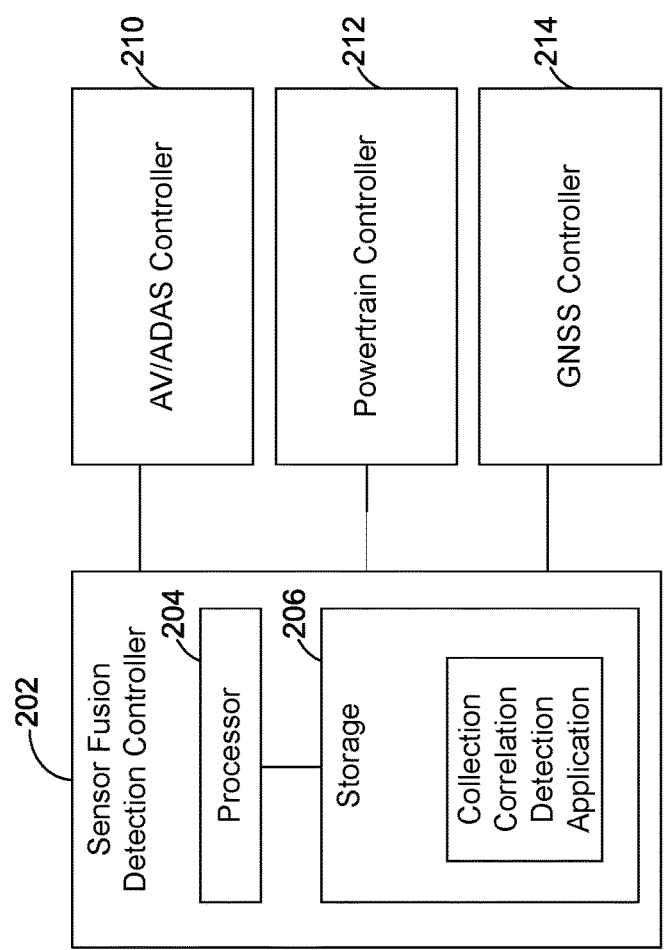
FIG. 2 depicts an illustrative schematic diagram of vehicle security enhancement, in accordance with one or more example embodiments of the present disclosure.

FIG. 2 shows some exemplary architecture of a sensor fusion detection controller, in accordance with one or more example embodiments of the present disclosure.

Referring to FIG. 2, there is shown exemplary components 200 associated with a sensor fusion detection controller 202. The sensor fusion detection controller 202 may comprise a processor 204 and the storage 206, such that storage 206 may be used to store data associated with collection, correlation, detection, and application associated with vehicle security enhancement. The exemplary components 200 also include an autonomous vehicle (AV)/advanced driver assistance systems (ADAS) controller 210, a powertrain controller 212, and a GNSS controller 214.

In one or more embodiments, a vehicle security enhancement system may facilitate a new approach of in-vehicle anomaly detection mechanism using the principle of sensor and electronic control unit (ECU) data consistency by analyzing multiple sensor data. For example, the vehicle security enhancement system may determine additional sensor information received from sensors such as Camera, RADAR, LiDAR, SONAR, autopilot, or ADAS. Based on the data received, the vehicle security enhancement system may analyze and determine whether an attack has occurred or not.

In the following Table 1, a set of three variables may be used by the vehicle security enhancement system in order to determine whether an attack has occurred. Table 1 shows Variable I, Variable II, and Variable III. Variable I may be associated with the speed information received from an electronic control unit (ECU) of the vehicle. Variable II may be associated with speed information received from a GPS. Variable III may be associated with speed from a camera of the vehicle.

These variables may be highly correlated with each other. For example, in case one variable (e.g., Variable I) is manipulated by attackers, the other variables (e.g., Variable II and Variable III) may be used as a reference in determining whether attacks occurred or not. In this scenario, a change in Variable I can be detected and identified based on using Variable II and/or Variable III. It should be understood that although this example shows the variables to be related to speed of the vehicle, other parameters may be utilized and correlated to determine whether an attack has occurred.

TABLE 1

| Variable I | Variable II | Variable III |
|---|---|---|
| Speed from ECU | Speed from GPS | Speed from Camera |
| AccelPedal Position from ECU | Acceleration from GPS | Acceleration from Camera |

Referring to Table 1, there is shown the triple set of variables, where the row of the Table 1 represents different sensor information, and the column of Table 1 represents different features.

In one or more embodiments, a vehicle security enhancement system may facilitate extracting one more variables from the respective vehicle sensors (e.g., three variables based on the example captured in Table 1). In one more embodiments, a vehicle security enhancement system may enable extraction of a number of vehicular parameters like speed, engine rpm, brake status, steering angle, yaw rate, accelerator pedal position, headlight status, wiper status, ambient temperature and ambient pressure. In the example of Table 1, there is shown a use of speed and AccelPedal Position data, but it should be understood that other vehicle data can be used.

For example, a Variable I may include a speed value that may be captured and a pedal position a vehicle parameter such as AccelPedal. This pedal position may be determined from data received from the ECU. In one or more embodiments, ECUs broadcast sensor measurements and control information onto shared communication channel such as CAN bus. The CAN bus can be accessed using a port (e.g., the OBD-II port) present in the vehicle. Through OBD-II, a vehicle security enhancement system may facilitate the reading, analyzing, decoding, and storing, the CAN data read from the CAN bus in real-time via OBD-II dongles. DBC file which defines the CAN IDs and other information helpful in decoding the CAN messages can be used for decoding CAN messages. After decoding, the information is populated in data structures that store the real time value of each sensor parameter and also written to the log files.

In one or more embodiments, a Variable II may include a speed and acceleration data received from a GPS system. The estimation of velocity and acceleration from discrete time signals in GPS is based on the differentiation of the carrier-phase measurements or the receiver-generated Doppler measurements. As with velocity estimation, it is preferable to generate the acceleration measurements from the differentiation of the carrier-phase rather than from the instantaneous Doppler measurement (which is noisier), where the speed range rates may be obtained and for the acceleration a range accelerations may also be obtained.

In one or more embodiments, a Variable III may include speed and acceleration data received from a camera associated with the vehicle. One important thing to realize is that having a single image frame alone does not tell us much about the speed. In terms of classical mechanics, the position of an object may be estimated based on a single frame, but to estimate the velocity at least two frames are needed because a time reference is needed. It is understood that velocity is in units of distance over time. The distance may be measured in meters, and the time may be measured in seconds. To calculate velocity, at least two successive frames are needed. To calculate acceleration, which is the change in velocity, about three frames are needed because how the velocity (2 frames) changes over time (3rd frame) will need to be calculated. Acceleration is in units meters over second$^2$. Applying Lucas Kanade or Farneback optical flow method may be applied to identify object position changes between two frames.

In one or more embodiments, a vehicle security enhancement system may facilitate detecting malicious attacks based on two or more variables. For example, one variable change can be identified by other variables because those variables are highly correlated. Correlation is able to be calculated by common equation or any other correlation equation:

$$r = \frac{\sum_i (x_i - \bar{x})(y_i - \bar{y})}{\sqrt{\sum_i (x_i - \bar{x})^2} \sqrt{\sum_i (y_i - \bar{y})^2}},$$

Where $0 \leq r \leq 1$, for example, x can be Variable I and y can be Variable II of Table 1. There will be combinations with Variable I and III and Variable II and Variable III. For example, in the case that one variable may have been manipulated by attackers, the other variables may be used as references. However, a threshold value T may need to be considered. For example, if $r<T$, where $0<T \leq 1$, a vehicle security enhancement system may identify or detect there has been an anomaly because the two variables would be considered. In that case, the vehicle security enhancement system may determine that there is an attack present. An optimal T value can be set by considering statistical variations of correlation coefficient r.

In one or more embodiments, a sensor fusion detection controller 202 associated with the vehicle 102 of FIG. 1 may be used for vehicle security enhancement. The Sensor fusion detection controller 202 may be located separately from other vehicle components, and also located separately from the in-vehicle network of other vehicle components which provide Variables (e.g., Variable I from Powertrain Controller 212, Variable II from GNSS Controller 2014, and Variable III from AV/ADAS Controller 210). This way attackers may be unable to manipulate or compromise all of the networks and components at the same time.

It is understood that the above descriptions are for purposes of illustration and are not meant to be limiting. It should also be understood that even though the various components in FIG. 1 and FIG. 2 are shown as discrete functional blocks, some of these components, or some parts of these components, may be combined together in some implementations in accordance with the disclosure.

Figure 3:
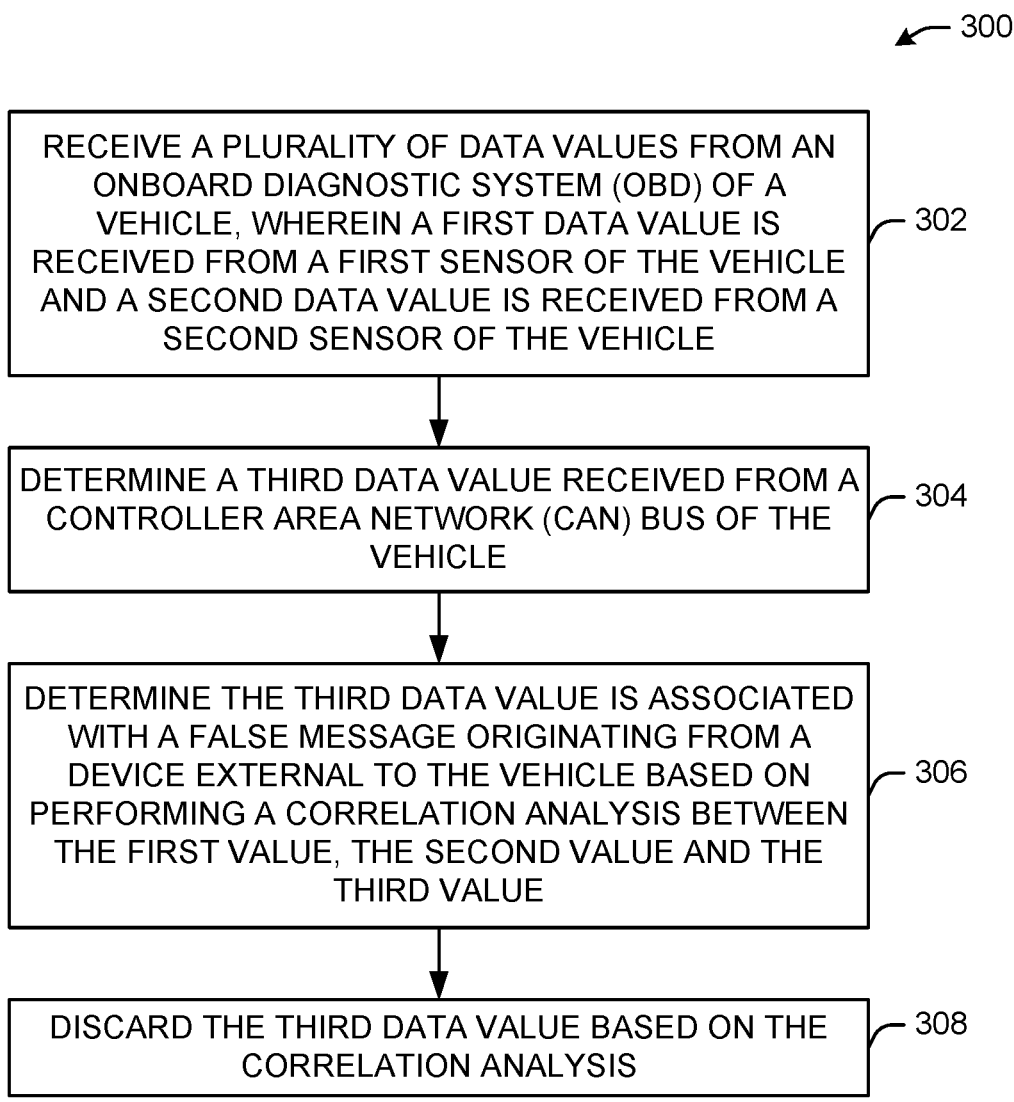
FIG. 3 depicts a flow diagram of an illustrative process for a vehicle security enhancement system, in accordance with one or more embodiments of the disclosure.

FIG. 3 illustrates a flow diagram of illustrative process 300 for an illustrative vehicle security enhancement system, in accordance with one or more example embodiments of the present disclosure.

At block 302, a device or system of a vehicle (e.g., the vehicle 102 of FIG. 1) may receive a plurality of data values from an onboard diagnostic system (OBD) of a vehicle, wherein a first data value is received from a first sensor of the vehicle and a second data value is received from a second sensor of the vehicle.

At block 304, the device or system may determine a third data value received from a controller area network (CAN) bus of the vehicle.

At block 306, the device or system may determine the third data value is associated with a false message originating from a device external to the vehicle based on performing a correlation analysis between the first value, the second value and the third value.

At block 308, the device or system may discard the third data value based on the correlation analysis.

It is understood that the above descriptions are for purposes of illustration and are not meant to be limiting.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
receiving a plurality of data values from an onboard diagnostic system (OBD) of a vehicle, wherein a first data value is received from a first sensor of the vehicle and a second data value is received from a second sensor of the vehicle;
determining a third data value received from a controller area network (CAN) bus of the vehicle;
performing a first correlation analysis between the first data value and the second data value;
performing a second correlation analysis between the second data value and the third data value;
performing a third correlation analysis between the first data value and the third data value;
determining the third data value is associated with a false message originating from a device external to the vehicle based on a combination of the first correlation analysis, the second correlation analysis, and the third correlation analysis; and
discarding the third data value.

2. The method of claim 1, further comprising comparing a result of the first correlation analysis, the second correlation analysis, and the third correlation analysis to a threshold value.

3. The method of claim 2, further comprising determining a state of a payload of a CAN message is attacked based on the result is larger than the threshold value.

4. The method of claim 2, further comprising determining a state of a payload of a CAN message is not attacked based on the result being less than the threshold value.

5. The method of claim 2, wherein comparing the result further comprises:
determining a first result of the first correlation analysis between the first data value and the second data value being less than the threshold;
determining a second result of the third correlation analysis between the first data value and the third data value being greater the threshold; and
flagging the third data value as associated with the false message based on the second result being greater the threshold.

6. The method of claim 1, wherein the first sensor and the second sensor are independently controlled.

7. The method of claim 1, wherein the plurality of data values are associated with vehicle speed, vehicle engine rotation per minute (RPM), vehicle brake status, vehicle steering angle, vehicle yaw rate, vehicle accelerator pedal position, vehicle headlight status, vehicle wiper status, vehicle ambient temperature, or vehicle ambient pressure.

8. The system of claim 1, wherein the first sensor and the second sensor are independently controlled.

9. The system of claim 1, further comprising the instructions to determine a state of a payload of a CAN message is attacked based on the result being larger than the threshold.

10. A device comprising:
a processor; and
a memory for storing instructions, the processor is configured to execute the instructions to:
receive a plurality of data values from an onboard diagnostic system (OBD) of a vehicle, wherein a first data value is received from a first sensor of the vehicle and a second data value is received from a second sensor of the vehicle;
determine a third data value received from a controller area network (CAN) bus of the vehicle;
perform a first correlation analysis between the first data value and the second data value;
perform a second correlation analysis between the second data value and the third data value;
perform a third correlation analysis between the first data value and the third data value;
determine the third data value is associated with a false message originating from a device external to the vehicle based on a combination of the first correlation analysis, the second correlation analysis, and the third correlation analysis; and
discard the third data value.

11. The device of claim 10, wherein the processing circuitry is further configured to compare a result of the first correlation analysis, the second correlation analysis, and the third correlation analysis to a threshold value.

12. The device of claim 11, wherein the processing circuitry is further configured to determine a state of a payload of a CAN message is attacked based on the result is larger than the threshold value.

13. The device of claim 11, wherein the processing circuitry is further configured determine a state of a payload of a CAN message is not attacked based on the result being less than the threshold value.

14. The device of claim 11, wherein comparing the result comprises the processing circuitry being further configured to:
  determine a first result of the first correlation analysis between the first data value and the second data value being less than the threshold;
  determine a second result of the third correlation analysis between the first data value and the third data value being greater the threshold; and
  flag the third data value as associated with the false message based on the second result being greater the threshold.

15. The device of claim 10, wherein the first sensor and the second sensor are independently controlled.

16. The device of claim 10, wherein the plurality of data values are associated with vehicle speed, vehicle engine rotation per minute (RPM), vehicle brake status, vehicle steering angle, vehicle yaw rate, vehicle accelerator pedal position, vehicle headlight status, vehicle wiper status, vehicle ambient temperature, or vehicle ambient pressure.

17. A system, comprising:
  a sensor fusion detection controller having a processor and memory, the processor being configured to execute instructions stored in the memory to:
    receive a plurality of data values from an onboard diagnostic system (OBD) of a vehicle, wherein a first data value is received from a first sensor of the vehicle and a second data value is received from a second sensor of the vehicle;
    determine a third data value received from a controller area network (CAN) bus of the vehicle;
    perform a first correlation analysis between the first data value and the second data value;
    perform a second correlation analysis between the second data value and the third data value;
    perform a third correlation analysis between the first data value and the third data value;
    determine the third data value is associated with a false message originating from a device external to the vehicle based on a combination of the first correlation analysis, the second correlation analysis, and the third correlation analysis; and
    discard the third data value.

18. The system of claim 17, further comprising the instructions to compare a result of the first correlation analysis, the second correlation analysis, and the third correlation analysis to a threshold value.

* * * * *